United States Patent [19]

Akabane

[11] Patent Number: 4,644,580
[45] Date of Patent: Feb. 17, 1987

[54] SOUND-MULTIPLEXED TV SIGNAL DEMODULATOR HAVING ELECTRICALLY INDEPENDENT STEREO AND SAP DEMODULATION MEANS

[75] Inventor: Masashi Akabane, Tokyo, Japan
[73] Assignee: NEC Corporation, Japan
[21] Appl. No.: 754,817
[22] Filed: Jul. 12, 1985

[30] Foreign Application Priority Data

Jul. 12, 1984 [JP] Japan .................. 59-144681

[51] Int. Cl.$^4$ .............................. H04H 5/00
[52] U.S. Cl. .......................... 381/4; 381/12; 358/144
[58] Field of Search ............ 381/2, 3, 4, 5, 7, 12; 370/69.1; 358/144, 198

[56] References Cited

U.S. PATENT DOCUMENTS

| 4,272,788 | 6/1981 | Ogita ........................ 381/3 |
| 4,339,772 | 7/1982 | Eilers et al. ................ 358/144 |
| 4,368,354 | 1/1983 | Furihata et al. ............. 381/2 |
| 4,389,536 | 6/1983 | Schickedanz ................. 381/2 |
| 4,461,021 | 7/1984 | Schwarz et al. .............. 381/2 |
| 4,472,830 | 9/1984 | Nagai ........................ 381/2 |
| 4,486,897 | 12/1984 | Nagai ....................... 381/2 |

Primary Examiner—Forester W. Isen
Attorney, Agent, or Firm—Laff, Whitesel, Conte & Saret

[57] ABSTRACT

A sound-multiplexed TV signal demodulator includes a stereo demodulation means having a first phase-locked loop of a first voltage controlled oscillator and also having a first frequency divider and a first comparator, an L-R demodulator and a matrix circuit, a SAP demodulation means having a second voltage controlled oscillator and a second comparator, a SAP detector detecting absence of the SAP signal to produce a detection signal when the SAP signal is not received, means by using a signal obtained from the first frequency divider for producing a reference signal having a frequency integer times as high as the frequency of the stereo pilot signal, and means for fixing the oscillation frequency of the second voltage controlled oscillator at the reference frequency in response to the detection signal.

13 Claims, 4 Drawing Figures

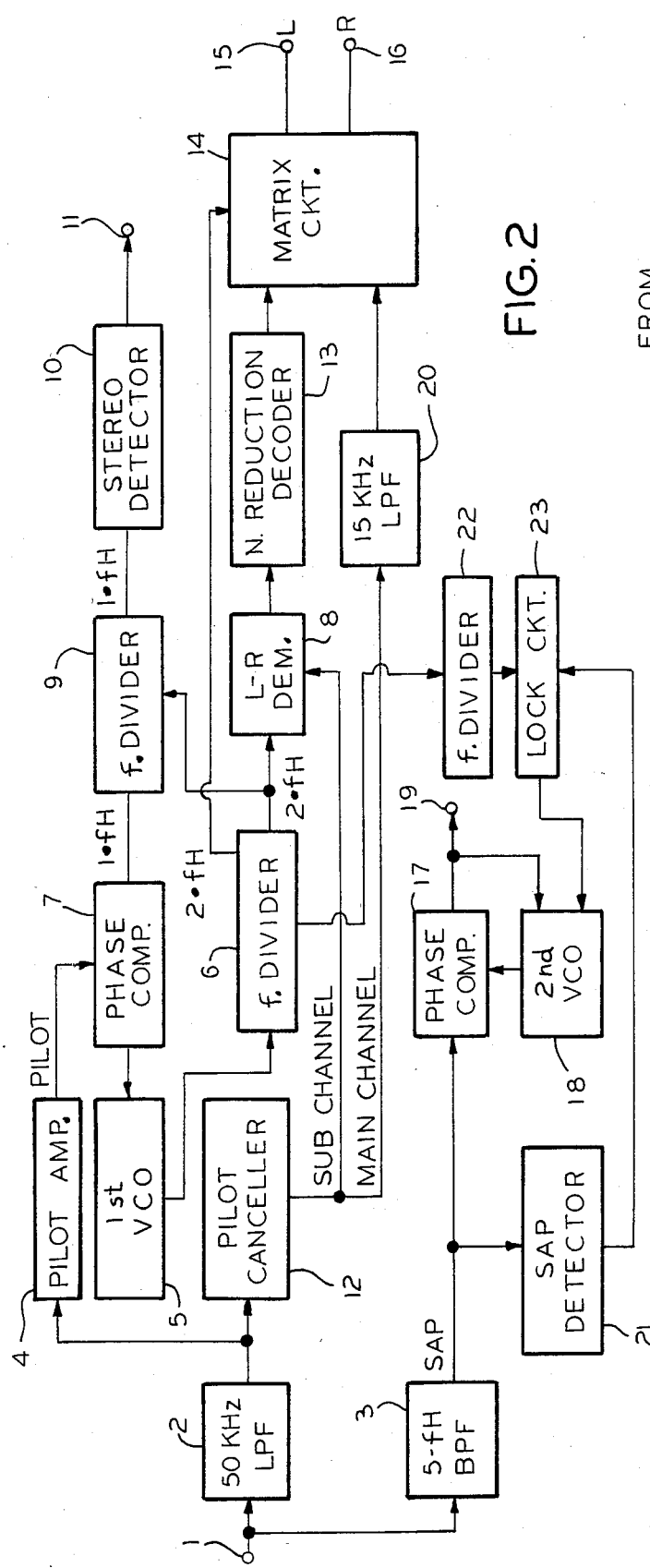
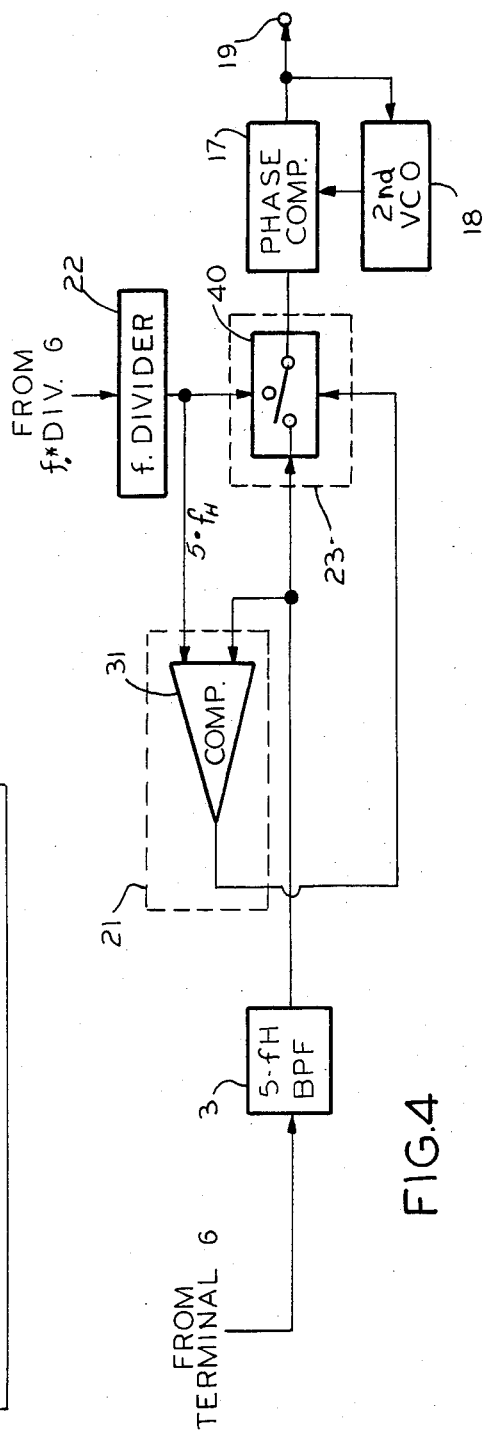
FIG.2
FIG.4

SOUND-MULTIPLEXED TV SIGNAL DEMODULATOR HAVING ELECTRICALLY INDEPENDENT STEREO AND SAP DEMODULATION MEANS

BACKGROUND OF THE INVENTION

1. Field of the Invention

This invention relates to a demodulator of a sound-multiplexed TV signal or a multi-channel stereo signal, and more particularly to a demodulator including demodulation means of stereo signal and Second Audio Program (hereinafter referred to as SAP) signal.

2. Description of the Related Art Including Information Disclosed §§ 1.97-1.99

A sound-multiplexed TV signal is transmitted in the form of a mixed signal of five signals components, which are a main channel signal (50 Hz~15 kHz) of L+R, a stereo pilot signal of $1 \cdot f_H$ (horizontal scanning frequency; 15.734 kHz), a sub-channel signal of L−R, an SAP signal and a telemetery signal. The main channel signal is a signal of L+R signal. The sub-channel signal is an AM-DSB signal of L−R signal or L−R signal which has been subjected to noise reduction process such as a dbx noise reduction process and modulated with $2 \cdot f_H$ signal. The SAP signal is an FM signal modulated with $5 \cdot f_H$ signal. The telemetery signal is an FM signal modulated with $6.5 \cdot f_H$ but is not demodulated to listen TV sound. All of the above five signals are FM-modulated to be broadcasted.

In a TV set, the received signal is FM-demodulated to reproduce the five signals. First, the L−R signal is reproduced from the sub-channel signal by using $2 \cdot f_H$ signal which is generated by a PLL (Phase Locked Loop) circuit. The PLL circuit includes a first voltage controlled oscillator (hereinafter a voltage controlled oscillator is referred to as a VCO), a frequency divider dividing the output frequency of the first VCO and a phase comparator comparing the divided frequency and the stereo pilot signal of $1 \cdot f_H$ to control the output frequency of the first VCO by the comparison output. The demodulated L−R signal is applied to a matrix circuit with the L+R signal of the main channel signal to separate L and R signals. If the reproduced L−R signal was subjected to the noise reduction process, the L−R signal is decoded to produce an original L−R signal prior to the application to the matrix circuit. Additionally, the SAP signal is FM-demodulated by a PLL FM-demodulator which includes a second VCO having a free-running frequency of about $5 \cdot f_H$ and a phase comparator comparing the reproduced SAP signal and the output from the second VCO to control the output frequency of the second VCO.

Thus, a TV set has two VCO's to demodulate the sound-multiplexed signal. The two VCO's are independently operated. Therefore, no problem occurs when the SAP signal is demodulated. However, an interference between the output signals from the two VCO's occurs when the SAP signal is not received. This is because it is very hard that the free running frequency is precisely adjusted to the $5 \cdot f_H$. If the SAP signal is not received, the second VCO oscillates at the free running frequency. A deviation of the free running frequency from the $5 \cdot f_H$ generates a cross modulation with the output from the first VCO.

SUMMARY OF THE INVENTION

A primary object of the present invention is to provide a sound-multiplexed TV signal demodulator having stereo and SAP demodulation means which do not generate a cross modulation.

According to the present invention, there is provided a sound-multiplexed TV signal demodulator comprising a carrier generator generating a carrier signal in synchronism with a stereo pilot signal and including a closed loop of a first voltage controlled oscillator, a frequency divider and a first phase comparator, an L−R signal demodulator reproducing an L−R signal from a sub channel signal by using the carrier signal, a matrix circuit receiving the L−R signal and a main channel signal and producing L and R signals in response to the L−R signal and a main channel signal, a SAP demodulator including a second voltage controlled oscillator and a second phase comparator comparing a SAP signal and the output signal from the second voltage controlled oscillator to control the output signal frequency from the second voltage controlled oscillator, a detector for detecting the reception of the SAP signal, and a means for fixing the output signal frequency from the second voltage controlled oscillator at integer times of the frequency of the stereo pilot signal in response to the output from the detector.

In accordance with the present invention, the second voltage controlled oscillator oscillates at a frequency integer times of the frequency of the stereo pilot signal when the SAP signal is not received. At this time, the first voltage controlled oscillator oscillates at a frequency integer times of the stereo pilot signal frequency by the operation of the closed loop of the first voltage controlled oscillator, a frequency divider and a phase comparator. Any harmonic is not generated, resulted in no cross modulation.

When the SAP signal is received, the frequency of the second voltage controlled oscillator is controlled to a carrier frequency of the SAP signal, namely $5 \cdot f_H$. Therefore, no harmonic is generated. In this case, cross modulation is not produced, similarly to the case where the SAP signal is not received.

BRIEF DESCRIPTION OF THE DRAWINGS

The above and other objects, features and advantages of the invention will become more apparent from the description taken in conjunction with the accompanying drawings, wherein:

FIG. 2 is a block diagram of a sound-multiplexed TV signal demodulator according to a preferred embodiment of the present invention;

FIG. 4 is a circuit diagram of another example of the SAP detector 24 and the locking circuit 26 n FIG. 2.

Figure 1:
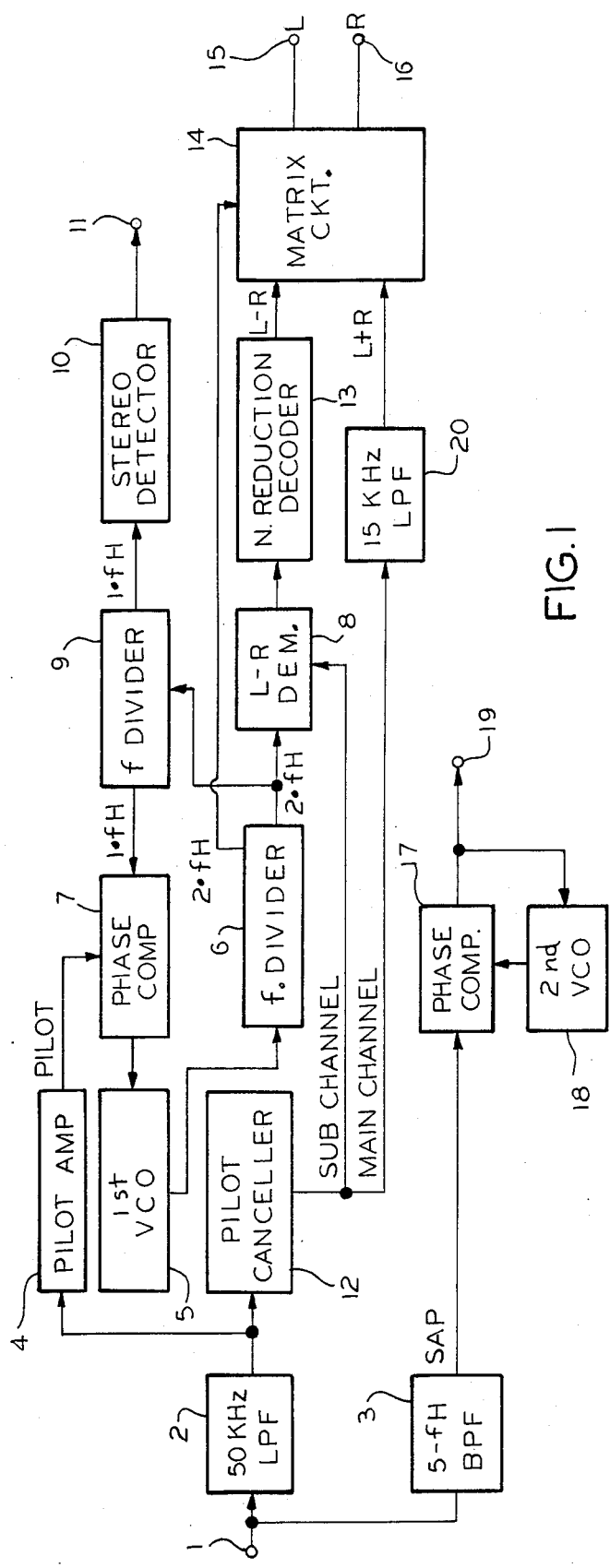
FIG. 1 is a block diagram of a sound-multiplexed TV signal demodulator which is easily designed by the skilled in the art.

Referring first to FIG. 1, any person skilled in the art can easily design the sound-multiplexed TV signal demodulator as shown in the drawing, taking the composition of the sound-multiplexed TV signal into his consideration. The sound-multiplexed TV signal is obtained by FM-demodulating a received TV signal and is applied to the input terminal 1. The applied sound-multiplexed TV signal is passed through a low-pass filter 2 to derive signal components having frequencies lower than 50 kHz which involve the stereo pilot signal, the main channel signal and the sub-channel signal. The stereo pilot signal is picked up by a pilot amplifier 4 to be fed to a phase comparator 7. The phase comparator 7 compares the phases of the stereo pilot signal and an output signal from a frequency divider 9 to adjust an oscillation frequency of a first VCO 5. The output of the first VCO 5 is fed to a frequency divider 6 to produce a signal having a frequency of $2 \cdot f_H$ ($f_H$ is a horizontal scanning frequency) which is further divided by the frequency divider 9 to provide a signal of $1 \cdot f_H$, and which is also applied to an L−R demodulator 8 as a carrier signal for an AM-demodulation operation. The frequency divider 9 produces another signal of $1 \cdot f_H$ which is applied to a stereo detector 10. The stereo detector 10 detects a frequency of $1 \cdot f_H$ to produce a signal for a stereo indicator at a terminal 11.

The output signal from the low-pass filter 2 is applied to a pilot canceller 12 to remove the stereo pilot signal. The output signal from the pilot canceller 12 involves the sub-channel signal of AM-demodulated L−R signal and the main channel signal of L+R signal and is AM-demodulated in the L−R demodulator 8 by using the $2 \cdot f_H$ signal from the frequency divider 6 as a carrier signal to reproduce an L−R signal. The transmitted L−R signal has been encoded by a noise reduction process. Therefore, the reproduced L−R signal is decoded by a noise reduction decoder 13 and then applied to a matrix circuit 14 to which an L+R signal is also applied. The L+R signal is reproduced by a 15 kHz low-pass filter 20. The carrier signal for the matrix circuit 14 is produced from the frequency divider 6. The frequency of the carrier signal has a frequency of $2 \cdot f_H$ but has a phase different from the $2 \cdot f_H$ signal feeding to the L−R demodulator 8. In the matrix circuit 14, L−R and L+R signals are mixed to separate L and R signals which are outputted at the terminals 15 and 16, respectively.

For SAP demodulation, the sound-multiplexed TV signal is fed to a phase comparator 17 through a $5 \cdot f_H$ band pass filter 3. The phase comparator 17 compares the outputs from the $5 \cdot f_H$ band pass filter 3 and from a second VCO 18 to control the output frequency of the second VCO 18. The PLL loop composed of the phase comparator 17 and the second VCO 18 operates as an FM demodulator to produce a demodulated SAP signal at a terminal 19.

When the SAP signal is involved in the received sound-multiplexed TV signal, the oscillation frequency of the second VCO 18 is fixed at $5 \cdot f_H$, because the center frequency of the SAP signal is $5 \cdot f_H$. The first VCO 5 operates at a frequency integer times of $1 \cdot f_H$. Therefore, no interference occurs between the output signals of first and second VCO's 5 and 18. Normal stereo separation and SAP demodulation are properly performed.

However, when the SAP signal is not received, the second VCO 18 is not controlled by the output of the phase comparator 17 and oscillates at a free running frequency. In a manufacturing process, the free running frequency is adjusted at a frequency of $5 \cdot f_H$, but it is hard to adjust it exactly at $5 \cdot f_H$. Small deviation of the free running frequency from $5 \cdot f_H$ is inevitable. This small deviation produces a cross modulation with the output frequency of the first VCO 5. As a result, large distortion appears in the separated L and R signals.

DESCRIPTION OF THE PREFERRED EMBODIMENT

The preferred embodiment shown in FIG. 2 has the same fundamental structure as the sound-multiplexed TV signal demodulator explained with reference to FIG. 1. The same reference numerals as FIG. 1 are used in FIG. 3 for the same circuits to omit their explanations. An SAP detector 21, a frequency divider 22 and a locking circuit 23 are newly added to fix the oscillation frequency of the second VCO 18 at a frequency integer times of $f_H$, preferably at a frequency of $5 \cdot f_H$, when the SAP signal is not received.

The SAP detector 21 detects absence of the SAP signal and produce a detection signal when the SAP signal is not received. The frequency divider 22 divides the frequency of the signal derived from the frequency divider 6 to produce a signal of $5 \cdot f_H$. The locking circuit 23 produces a D.C. voltage to make the second VCO 18 oscillate at a frequency of $5 \cdot f_H$, by using the signal of $5 \cdot f_H$ from the frequency divider 22. The D.C. voltage is applied to the second VCO in response to the detection signal to make the second VCO oscillate at a frequency of $5 \cdot f_H$.

When the SAP signal is received, no detection signal is applied to the locking circuit 23, and the oscillation frequency of the second VCO 18 is controlled at $5 \cdot f_H$ by the SAP signal. Therefore, no cross modulation occurs between the outputs of the first and second VCO's 5 and 18. On the other hand, when the SAP signal is not received, the locking circuit 23 applies the D.C. voltage to the second VCO 18 to make the second VCO 18 oscillate at a frequency of $5 \cdot f_H$. Since the D.C. voltage is produced from a signal of $5 \cdot f_H$, the second VCO oscillates exactly at a frequency of $5 \cdot f_H$. Therefore, no cross modulation occurs, similar to the case where the SAP signal is received. Thus, distortion in the separated L and R signals due to the cross modulation is suppressed in every reception conditions.

Figure 3:
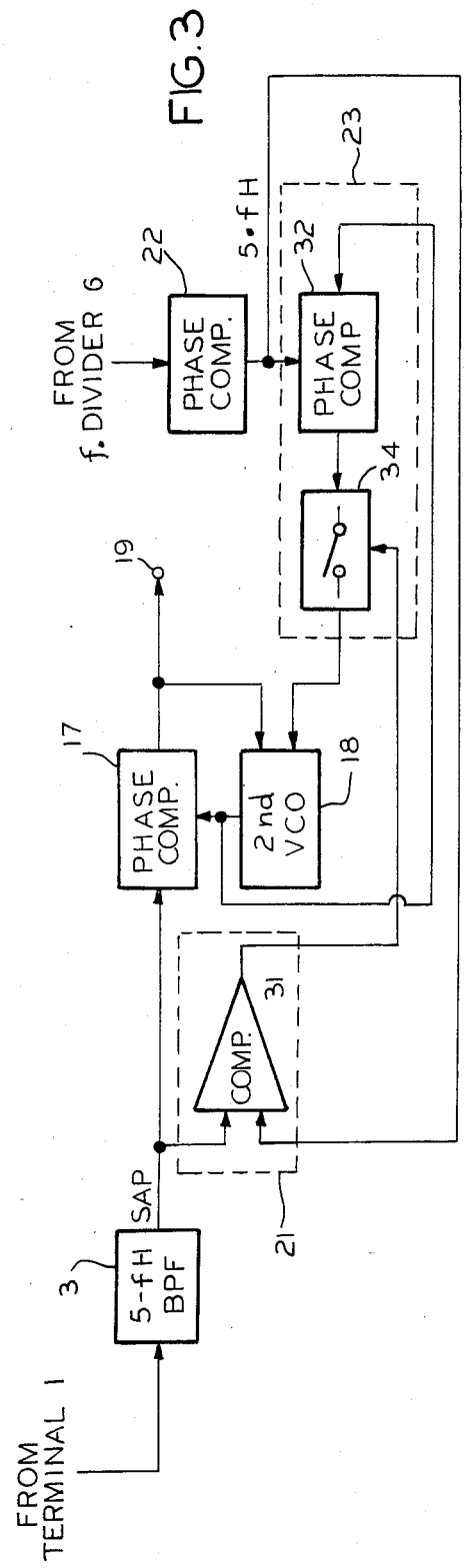
FIG. 3 is a circuit diagram of one example emboding the SAP detector 24 and the locking circuit 26 in FIG. 2.

Examples of the SAP detector 21 and the locking circuit 23 are shown in FIG. 3. The detector 21 is a phase comparator 31 comparing the output of the $5 \cdot f_H$ band pass filter 3 and the $5 \cdot f_H$ signal outputted from the frequency divider 22. If the SAP signal does not exist in the output of the $5 \cdot f_H$ band pass filter 3, the comparator 31 produces an output as the detection signal.

The locking circuit 23 is composed of a phase comparator 32 and a switch 34. The phase comparator 32 compares the signals from the frequency divider 22 and the second VCO 18. The comparison output of the phase comparator 32 is applied to the second VCO 18 through a switch 34. The switch 34 is closed in response to the detection signal from the comparator 31 to transmit the comparison output of the phase comparator 32 to the second VCO 18. As the result, the oscillation frequency of the second VCO 18 is locked at $5 \cdot f_H$ due to the PLL operation of the second VCO 18 and the phase comparator 32.

The oscillation frequency of the second VCO 18 is precisely controlled at $5 \cdot f_H$ irrespective of its free-running frequency, when the SAP signal is not received. Therefore, any interference is not produced with the output of the first VCO 5. This condition of no-interference is achieved even if the adjustment of the free-running frequency of the second VCO 5 has not been made exactly. Therefore, the present invention results in easy manufacturing process and a low production cost.

Many other modifications can be applied to the circuit shown in FIGS. 2 and 3. The SAP detector 21 may be constructed of a resonator having a resonance frequency of $5 \cdot f_H$. The locking circuit 23 may be composed of one switch 40 shown in FIG. 4 which shows other examples of the SAP detector 21 and the locking circuit 23. The switch 40 switches the input of the phase comparator 17 from the $5 \cdot f_H$ band pass filter 3 to the frequency divider 22 in response to the detection signal from the SAP detector 21. The closed loop of the phase comparator 17 and the second VCO 18 is separated from the $5 \cdot f_H$ band pass filter 3 to be controlled by the frequency divider 22 so as to oscillate at an exact frequency of $5 \cdot f_H$.

What is claimed is:

1. A demodulator for demodulating a sound-multiplexed TV signal including a main channel signal of an L+R signal, a stereo pilot signal, a sub-channel signal of a modulated L−R signal and a SAP signal, comprising:
    a carrier generator producing a carrier signal in synchronism with said stereo pilot signal, said carrier generator including a first closed loop of a first voltage controlled oscillator, a first frequency divider and a first phase comparator;
    an L−R demodulator demodulating said sub-channel signal by use of said carrier signal to produce an L−R signal;
    a matrix circuit mixing said L+R and L−R signals to separate L and R signals;
    a SAP demodulator for demodulating said SAP signal, said SAP demodulator including a second closed loop of a second phase comparator and a second voltage controlled oscillator;
    a SAP detector for detecting a reception of said SAP signal, said SAP detector producing a detection signal when said SAP signal is not received; and
    a means for fixing the oscillation frequency of said second voltage controlled oscillator at a reference frequency which is an integer times as high as a frequency of said stereo pilot signal in response to said detection signal.

2. A demodulator as claimed in claim 1, wherein said reference frequency is five times as high as the frequency of said stereo pilot signal.

3. A demodulator as claimed in claim 2, wherein said demodulator further includes a second frequency divider dividing a frequency of a signal obtained from said first closed loop to produce said reference frequency, said fixing means fixing said oscillation frequency of said second voltage controlled oscillator at said reference frequency obtained from said second frequency divider.

4. A demodulator as claimed in claim 3, wherein said fixing means includes a third phase comparator comparing said reference frequency with said oscillation frequency of said second voltage controlled oscillator and a switch means for controlling the application of the comparison result of said third phase comparator to said second voltage controlled oscillator in accordance with the output from said SAP detector.

5. A demodulator as claimed in claim 4, wherein said SAP detector includes a comparator comparing said reference frequency with the signal produced from said $5 \cdot f_H$ band pass filter.

6. A demodulator as claimed in claim 5, wherein said demodulator further includes a decoder of a noise reduction process interposed between said L−R demodulator and said matrix circuit.

7. A demodulator as claimed in claim 3, wherein said fixing means includes a switch means for changing the input of said second phase comparator between the signal produced from said $5 \cdot f_H$ band pass filter and said reference frequency in accordance with the output from said SAP detector.

8. A demodulator as claimed in claim 7, wherein said SAP detector includes a comparator comparing said reference frequency with the signal produced from said $5 \cdot f_H$ band pass filter.

9. A demodulator as claimed in claim 8, wherein said demodulator further includes a decoder of a noise reduction process interposed between said L−R demodulator and said matrix circuit.

10. A demodulator for demodulating a sound-multiplexed TV signal including a main channel signal of an L+R signal, a stereo pilot signal, a sub-channel signal of a modulated L−R signal and a SAP signal, comprising:
    a first phase locked loop including a first voltage controlled oscillator, a first frequency divider dividing the oscillation frequency of said first voltage controlled oscillator and a first comparator comparing the signal produced from said first frequency divider with said stereo pilot signal, said first phase locked loop producing a carrier signal having a frequency two times as high as the frequency of said stereo pilot signal;
    an L−R demodulator demodulating said sub-channel signal with said carrier signal to produce an L−R signal;
    a matrix circuit separating L and R signals by using said L+R and L−R signals;
    a second phase locked loop including a second voltage controlled oscillator and a second comparator comparing the output of said second voltage controlled oscillator with said SAP signal;
    a second frequency divider dividing the frequency of the signal obtained from said first frequency divider to a frequency five times as high as the frequency of said stereo pilot signal to produce a reference signal;
    a SAP detector detecting said SAP signal and producing a non-detection signal when said SAP signal is not received and a detection signal when said SAP signal is received;
    a third comparator comparing said reference signal with the output signal of said second voltage controlled signal; and
    a means for applying the comparison result of said third comparator to said second voltage controlled oscillator in response to said non-detection signal and for separating said third comparator from said second voltage controlled oscillator in response to said detection signal.

11. A demodulator as claimed in claim 10, wherein said demodulator further comprises a recoder of a noise reduction process interposed between said L−R demodulator and said matrix circuit.

12. A demodulator for demodulating a sound multiplexed TV signal including a main channel signal of an L+R signal, a stereo pilot signal, a sub-channel signal of a modulated L−R signal and a SAP signal, comprising;
    a first input terminal receiving said stereo pilot signal;

a first phase locked loop including a first voltage controlled oscillator, a first frequency divider dividing the oscillation frequency of said first voltage controlled oscillator and a first comparator comparing the signal produced from said first frequency divider with said stereo pilot signal, said first phase locked loop producing a carrier signal having a frequency two times as high as the frequency of said stereo pilot signal;

a second input terminal receiving said sub-channel signal;

an L−R demodulator demodulating said sub-channel signal with said carrier signal to produce an L−R signal;

a third input terminal receiving said main channel signal;

a matrix circuit separating L and R signals by using said L+R and L−R signals;

a second phase locked loop including a second voltage controlled oscillator and a second comparator having a first input receiving the output of said second voltage controlled oscillator and a second input, said second comparator comparing the output of said second voltage controlled oscillator with a signal receiving at said second terminal to control the oscillation frequency of said second voltage controlled oscillator;

a fourth input terminal receiving said SAP signal;

a second frequency divider dividing the frequency of a signal obtained from said first frequency divider to provide a reference frequency five times as high as the frequency of said stereo pilot signal;

a SAP detector detecting said SAP signal applied to said fourth input terminal to produce a detection signal and a non-detection signal; and a means for connecting said fourth input terminal and said second input of said second comparator in response to said detection signal and applying said reference signal to said second input of said second comparator in response to said non-detection signal.

13. A demodulator as claimed in claim 12, wherein said demodulator further comprises a recoder of a noise reduction process interposed between said L−R demodulator and said matrix circuit.

* * * * *